Patented June 7, 1932

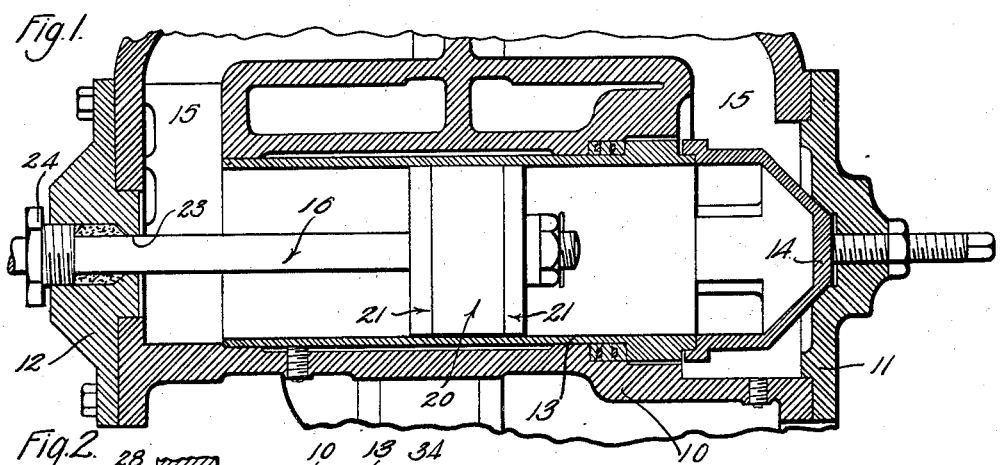
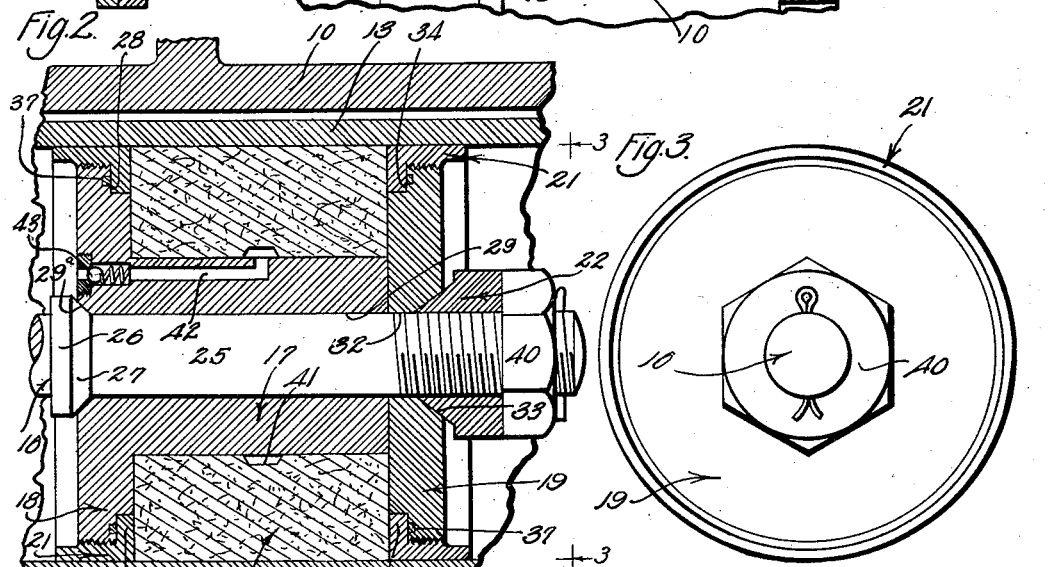
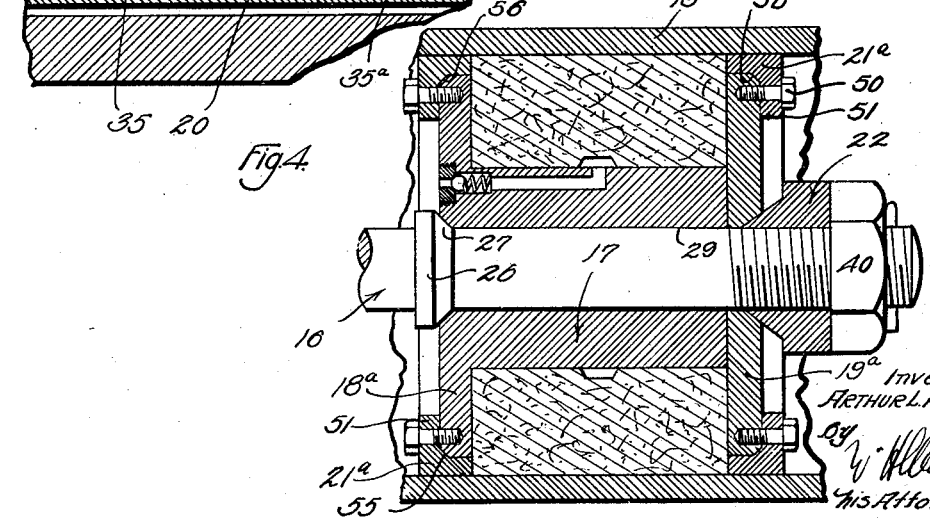

1,862,251

UNITED STATES PATENT OFFICE

ARTHUR L. ARMENTROUT, OF LONG BEACH, CALIFORNIA

PISTON

Application filed January 13, 1930. Serial No. 420,447.

This invention relates to a piston and relates more particularly to a construction for the piston of a pump, or the like.

In pumps used for handling fluid containing solid matter at high pressures, for example slush pumps, the wearing parts or cylinder engaging parts of the pistons cut out very quickly through the action of sand or solid matter in the fluid and the pistons must be replaced after short periods of use. Only relatively small portions of slush pump pistons receive this excessive wear and the remaining parts of the pistons are not worn to an appreciable extent. Further, the pistons of slush pumps, or the like, are usually wedged or clamped onto tapered portions of the piston rods and it is often very difficult to remove them from the rods.

It is a general object of the invention to provide a piston particularly suited for use in a slush pump used for handling fluid containing solid matter.

Another object of the invention is to provide a piston for a pump, or the like, in which the wearing parts or cylinder engaging parts are replaceable and are inexpensive of manufacture.

Another object of the invention is to provide a piston construction of the character mentioned in which the wear receiving parts are extremely simple of construction and are easily replaced.

Another object of the invention is to provide a piston rod and piston assembly for a pump, or the like, in which the piston may be easily and quickly dismounted from the piston rod.

A further object of the invention is to provide a piston rod and piston construction in which the piston is mounted on a portion of the piston rod having parallel sides and is clamped against an enlargement or projection on the piston rod.

Other objects and features of the invention will be best and more fully understood from the following detailed descriptions of typical forms and applications of the invention, throughout which description reference is had to the accompanying drawing in which:

Fig. 1 is a longitudinal detailed sectional view of a typical form of slush pump illustrating the piston provided by the invention arranged in the cylinder of the pump. Fig. 2 is an enlarged vertical detailed sectional view of the piston showing it mounted on the piston rod provided by the invention. Fig. 3 is an end view of the piston being a view taken as illustrated by line 3—3 on Fig. 2. Fig. 4 is a view similar to Fig. 2 illustrating another form of the invention.

The piston rod and piston construction provided by this invention may be embodied in various forms of engines, pumps, etc. The piston is particularly adapted for use in a slush pump for handling liquid containing solid matter at high pressures and throughout the following detailed description I will describe the piston rod and piston construction provided by the present invention embodied in a typical form of slush pump. It is to be understood, however, that the invention is not to be construed as limited to the particular forms or application of the invention about to be described but is to be taken as including any features or modifications that may fall within the scope of the claims.

The pump illustrated in the drawing is a typical form of slush pump and includes, generally, a cylinder 10, heads 11 and 12 closing the opposite ends of the cylinder, a liner 13 in the cylinder 10, a clamp or spider 14 retaining the liner in the cylinder, ports 15 in the opposite ends of the cylinder, and various other parts common to pumps of this general character.

The present invention provides, generally, a piston rod 16 extending into the cylinder 10, a piston mounted on the rod 16 and including, a body 17 having an end plate 18 at one end, a head or end plate 19 mounted on the rod 16 at the opposite end of the body, packing 20 on the body between the plates 18 and 19, replaceable cylinder engaging parts 21 carried by the plates 18 and 19 to slidably engage the cylinder or liner 13, and a nut 22 clamping the body 17 and the plate 19 on the piston rod 16.

The piston rod 16 may be similar, generally, to the piston rods usually employed in pumps, etc. In the drawing I have shown the piston rod 16 slidable in an opening 23 in the head 12 and extending into the cylinder 10. A suitable packing gland 24 may be provided in the opening 23 to pack around the rod. The inner end portion 25 of the rod which carries the body 17 of the piston is preferably round in cross sectional configuration and in accordance with the invention its exterior is parallel to the central longitudinal axis of the rod 16. An annular enlargement or projection 26 is provided on the rod 16 at the outer end of the portion 25. The inner side 27 of the projection 26 is beveled as shown throughout the drawing. The inner end portion of the part 25 of the rod is screw-threaded to receive the nut 22.

The body 17 of the piston is cylindrical in its general configuration having a central longitudinal opening 29 passing the portion 25 of the piston rod. The body 17 may be mounted directly on the piston rod and the opening 29 may be of uniform diameter throughout its length. A tapered or beveled seat $29^a$ is formed in the outer end of the opening 29 to receive the beveled side 27 of the projection 26. The opposite ends of the body 17 are preferably made flat and at right angles to the longitudinal axis of the rod 16. The end plate 18 is in the form of an annular radially projecting flange on the outer end of the body 17. The end plate 18 may be integral with the body. The periphery of the end plate 18 is spaced inwardly of the walls of the liner 13. An annular recess or groove 28 is provided in the inner corner of the periphery of the plate 18.

The head or plate 19 is mounted on the portion 25 of the piston rod 16 at the inner end of the body 17. The end plate 19 is preferably separable from the body and is clamped against the end of the body by the nut 22. The end plate 19 is in the form of an annular disk having a central opening 32 passing the portion 25 of the rod. A tapered or beveled seat 33 is provided in the opening 32 to receive the end of the nut 22 as will be hereinafter described. The plate 19 is preferably of the same diameter as the end plate 18 and its periphery is accordingly spaced from the walls of the liner 13. An annular recess 34 is provided in the outer peripheral corner of the plate 19.

The replaceable parts 21 carried by the end plates 18 and 19 are one of the features of the invention and are provided to slidably operate on the walls of the liner 13, or the cylinder 10. The parts 21 carried by the end plates 18 and 19 are preferably alike in construction. The cylinder engaging parts 21 are in the form of rings adapted to be arranged on the peripheries of the end plates 18 and 19. In the form of the invention illustrated in Fig. 2 of the drawing, the parts 21 are screw-threaded on the plates 18 and 19. There is preferably one integral part 21 mounted on each plate. An inwardly projecting radial flange 35 is provided on the part 21, carried by the plate 18, to seat in the annular recess 28. A similar flange $35^a$ is provided on the part 21 carried by the plate 19 to seat in the recess 34 of the end plate 19. In the preferred from of the invention packing is provided in the recesses 28 and 34. In the particular case illustrated I have shown packing 37 arranged in annular grooves in the sides of the recesses 28 and 34 to seal against the flanges 35 and $35^a$ respectively. In the particular form of the invention illustrated in Figs. 1 and 2 of the drawing, the cylinder engaging part 21 on the end plate 18 is flush with the inner side of the plate 18, while the outer end of the part 21 on the plate 19 is flush with the outer side of plate 19. In the case shown the parts 21 project axially outward from the opposite ends of the piston.

The nut 22 is screw-threaded on the part 25 of the piston rod and clamps against the end plate 19 to retain the body 17 of the piston on the piston rod. The nut 22 has a tapered or beveled end which seats into or clamps against the seat 33 of the plate 19. The nut 22 acts to clamp the body 17 on the piston rod so that the seat $29^a$ of the opening 29 clamps against the end 27 of the projection 26 and the nut also clamps the end plate 19 against the inner end of the body. A lock nut 40 may be provided on the rod 16 to lock the nut 22 in position.

The packing 20 is mounted on the body 17 between the plates 18 and 19. The packing 20 may be a unitary body of rubber, or other suitable resilient packing material, and is provided to slidably engage or seal against the walls of the liner 13. It is preferred that the packing 20 be tightly clamped between the plates 18 and 19. In the preferred form of the invention, means is provided for expanding or urging the packing 20 outwardly into effective sealing engagement with the walls of the liner 13. In the form of the invention illustrated in the drawing, an annular groove 41 is provided on the interior or inner wall of the packing 20. A port or passage 42 is provided in the body 18 and extends from the outer end of the body to the groove 41. A suitable check valve 43 may be arranged in the passage 42. Pressure developed in the cylinder 10 of the pump during the back stroke of the piston acts to expand or urge the packing outward into the proper sealing engagement with the walls of the liner.

In the form of the invention illustrated in Fig. 4 of the drawing, the wear receiving or liner engaging parts $21^a$ on the end plates $18^a$ and $19^a$ are detachably secured to the plates by means of screws 50. In this form of the invention the parts $21^a$ extend over the peripheries of the plates $18^a$ and $19^a$ and are provided with inwardly projecting radial flanges 51 to seat against the sides of the plates. In the particular case illustrated the flanges 51 of the parts 21ª are positioned or formed to seat against the inner side of the plate 19ª and to seat against outer side of the plate 18ª. Suitable bolts or screws 50 extend through openings in the flanges 51 and screw-thread into the plates 18ª and 19ª to detachably secure the parts 21ª to the end plates. In this form of the invention, a tapered or ground seat 55 may be provided on a peripheral corner of each of the plates 18ª and 19ª to seat against or seal with a ground tapered face 56 on each of the parts 21ª. The faces 56 may be formed at the points of joinder of the flanges 51 and the plates.

It is believed that the utility and practicability of the piston construction provided by this invention will be understood from the foregoing detailed description. It is to be noted that the parts 21 and the packing 20 are the only portions of the piston which receive any appreciable wear. The packing and parts 21 may be quickly and easily replaced when desired or necessary. The parts 21 are extremely simple in formation and are inexpensive of manufacture. The construction embodies a minimum number of parts and the various parts are of simple formation. The piston rod 16 is constructed so that the body 17 of the piston may be quickly and easily removed from the piston rod when desired. The tapered side 27 of the projection 26 and the beveled end on the nut 22 act to properly center the body 17 and the end plate 19 on the rod 16 without wedging or clamping them on to the rod. It is to be noted that the construction does not embody any parts that require accurate machining or that are difficult or expensive to manufacture.

Having described only a typical preferred form of my inventon, I do not wish to limit myself to the specific details set forth but wish to reserve to myself any changes or variations that may appear to those skilled in the art or fall within the scope of the following claims.

Having described my invention, I claim:

1. A piston of the character described including, a body, a head, a detachable annular part screw-threaded on the periphery of the head, and a flange on the part seated in a recess in the head.

2. A piston of the character described including, a body, an integral end plate at one end of the body, a separable plate clamped against the opposite end of the body, packing on the body between the plates, a replaceable annular part extending over the periphery of each plate adapted to slidably engage a cylinder wall, and a flange on each part seated in a recess in a plate.

3. A piston of the character described including, a body, an integral end plate at one end of the body, a separable plate clamped against the opposite end of the body, packing on the body between the plates, a replaceable annular part extending over the periphery of each plate adapted to slidably engage a cylinder wall, and a flange on each part seated in a recess in a plate, there being packing between the flanges and the walls of the recesses.

4. A piston including, a body for mounting on a piston rod, an integral end plate at one end of the body, a removable end plate clamped against the other end of the body, packing between the end plates for slidably engaging the walls of a cylinder, rings removably screw threaded on the peripheries of the end plates, flanges on the rings seated in recesses in the inner ends of the end plates, and packing in the recesses for sealing with the flanges.

5. A piston including, a body for mounting on a piston rod, an integral end plate at one end of the body, a removable end plate clamped against the other end of the body, packing between the end plates for slidably engaging the walls of a cylinder, rings removably screw threaded on the peripheries of the end plates, flanges on the rings seated in recesses in the inner ends of the end plates, the inner ends of the rings being flush with inner ends of the end plates, and means whereby the packing may be expanded.

6. A piston including, a body for mounting on a piston rod, an integral end plate at one end of the body, a removable end plate, means for clamping the removable end plate against the other end of the body and for retaining the body on the piston rod, expansible packing on the body between the end plates for slidably engaging the walls of a cylinder, replaceable rings screw threaded axially outward on the peripheries of the end plates adapted to slidably engage the cylinder walls, flanges on the rings seated in recesses in the inner ends of the end plates, and packing in the recesses for sealing with the flanges, the flanges operating to limit threading of the rings on the end plates and to clamp against the last-mentioned packing.

In witness that I claim the foregoing I have hereunto subscribed my name this 7th day of January, 1930.

ARTHUR L. ARMENTROUT.